United States Patent
Abraham et al.

(10) Patent No.: US 11,609,824 B2
(45) Date of Patent: Mar. 21, 2023

(54) BYZANTINE FAULT TOLERANT VIEW CHANGE PROCESSING

(71) Applicant: VMware, Inc., Palo Alto, CA (US)

(72) Inventors: Ittai Abraham, Herzliya (IL); Hristo Staykov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/382,756

(22) Filed: Jul. 22, 2021

(65) Prior Publication Data

US 2023/0027259 A1    Jan. 26, 2023

(51) Int. Cl.
*G06F 11/00* (2006.01)
*G06F 11/14* (2006.01)
*G06F 16/27* (2019.01)

(52) U.S. Cl.
CPC .......... *G06F 11/1451* (2013.01); *G06F 16/27* (2019.01); *G06F 2201/82* (2013.01)

(58) Field of Classification Search
CPC ............. G06F 11/0709; G06F 11/1451; G06F 11/182; G06F 11/183; G06F 11/187; G06F 11/2041; G06F 16/2365; G06F 16/2379; G06F 16/27; G06F 2201/82; G06F 9/5083; H04L 9/50
See application file for complete search history.

(56) References Cited

U.S. PATENT DOCUMENTS

| | | | | |
|---|---|---|---|---|
| 6,671,821 | B1 * | 12/2003 | Castro | G06F 11/1482 714/21 |
| 7,334,154 | B2 * | 2/2008 | Lorch | G06F 11/187 714/13 |
| 10,503,614 | B2 | 12/2019 | Abraham et al. | |
| 2012/0254412 | A1 * | 10/2012 | Goose | G06F 9/5072 709/224 |
| 2020/0028947 | A1 * | 1/2020 | Yang | H04L 9/0643 |

OTHER PUBLICATIONS

Miguel Castro et al., "Practical Byzantine Fault Tolerance", Proceedings of the Third Symposium on Operating Systems Design and Implementation, OSDI '99, Feb. 1999, 14 pages, Berkeley, CA, USA.
Guy Golan Gueta., et al. "SBFT: a Scalable and Decentralized Trust Infrastructure", arXiv:1804.01626v3 [cs.DC], Jan. 2, 2019, 14 pages.

* cited by examiner

*Primary Examiner* — Michael Maskulinski

(57) ABSTRACT

In some embodiments, a method implements a Byzantine fault tolerant protocol. A first replica detects a condition to cause a view change procedure to move from a current view to a next view. The first replica sends a message indicating the first replica wants to leave the current view. Also, the first replica receives a set of messages from second replicas indicating a respective second replica wants to leave the current view. The first replica determines when a property is received to the leave the current view based on the set of messages from the set of second replicas. When it is determined the property is received, the first replica performs a process to leave the current view. When it is determined the property is not received, the first replica stays in the current view and participating in processing a request from a client in the current view.

21 Claims, 10 Drawing Sheets

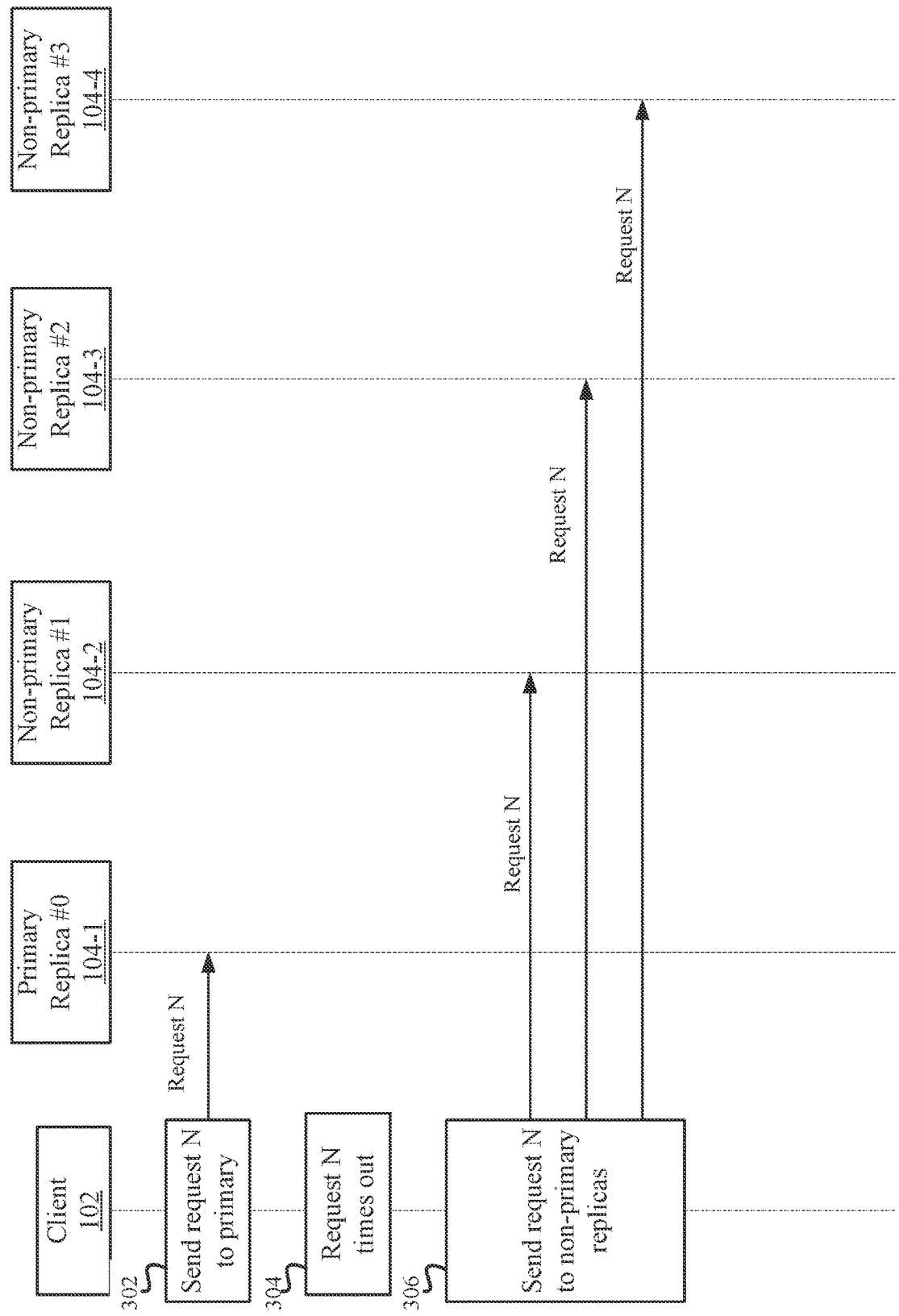

BYZANTINE FAULT TOLERANT VIEW CHANGE PROCESSING

BACKGROUND

Byzantine fault tolerance (BFT) refers to the ability of a computing system to endure arbitrary (e.g., Byzantine) failures that would otherwise prevent the system's components from reaching consensus on decisions critical to the system's operation. In the context of state machine replication (SMR) (e.g., a scenario where a system provides a service whose operations and state are replicated across multiple nodes, known as replicas), BFT protocols are used to ensure that non-faulty replicas are able to agree on a common order of execution for client-requested service operations. This, in turn, ensures that the non-faulty replicas will execute the client operations in an identical and thus consistent manner.

A leader-based BFT SMR protocol generally proceeds according to a series of iterations, known as views, and relies on one replica, referred to as a primary, to drive a consensus decision in each view. In each view, the primary sends a proposal for a decision value (e.g., operation sequence number) to the other replicas and attempts to get 2f+1 replicas to agree upon the proposal (e.g., via voting messages), where f is the maximum number of replicas that may be faulty. If this succeeds, the proposal becomes a committed decision. However, if this does not succeed (due to, e.g., a primary failure), the replicas enter a "view change" procedure in which a new view is entered and a new primary is selected. Then, the new primary transmits a new proposal comprising votes received from replicas in the prior view.

There may be situations where a replica may detect an issue, which causes the view change procedure to be performed. As described above, upon performing the view change procedure, the replica then moves to the next view. In some cases, the issue causing the move to the next view may be temporary. However, since the replica has moved to the next view, the replica stops voting in the current view. To start voting in a new view, a quorum of view change messages to move to the next view must be received from other replicas. Accordingly, the replica will wait in the next view until the quorum of view change messages is reached. In some cases, such as where the replica was temporarily disconnected from other replicas, the other replicas may not immediately join the replica in the next view because they are not experiencing the same issues. These replicas may continue to vote in the current view. There is no time bound on when other replicas may move to the next view as there has to be further disconnections in the system for other replicas to initiate a view change to the next view.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In the accompanying drawings:

FIGS. 3A to 3D depict a view change procedure that uses the triggering phase according to some embodiments.

DETAILED DESCRIPTION

Figure 1:
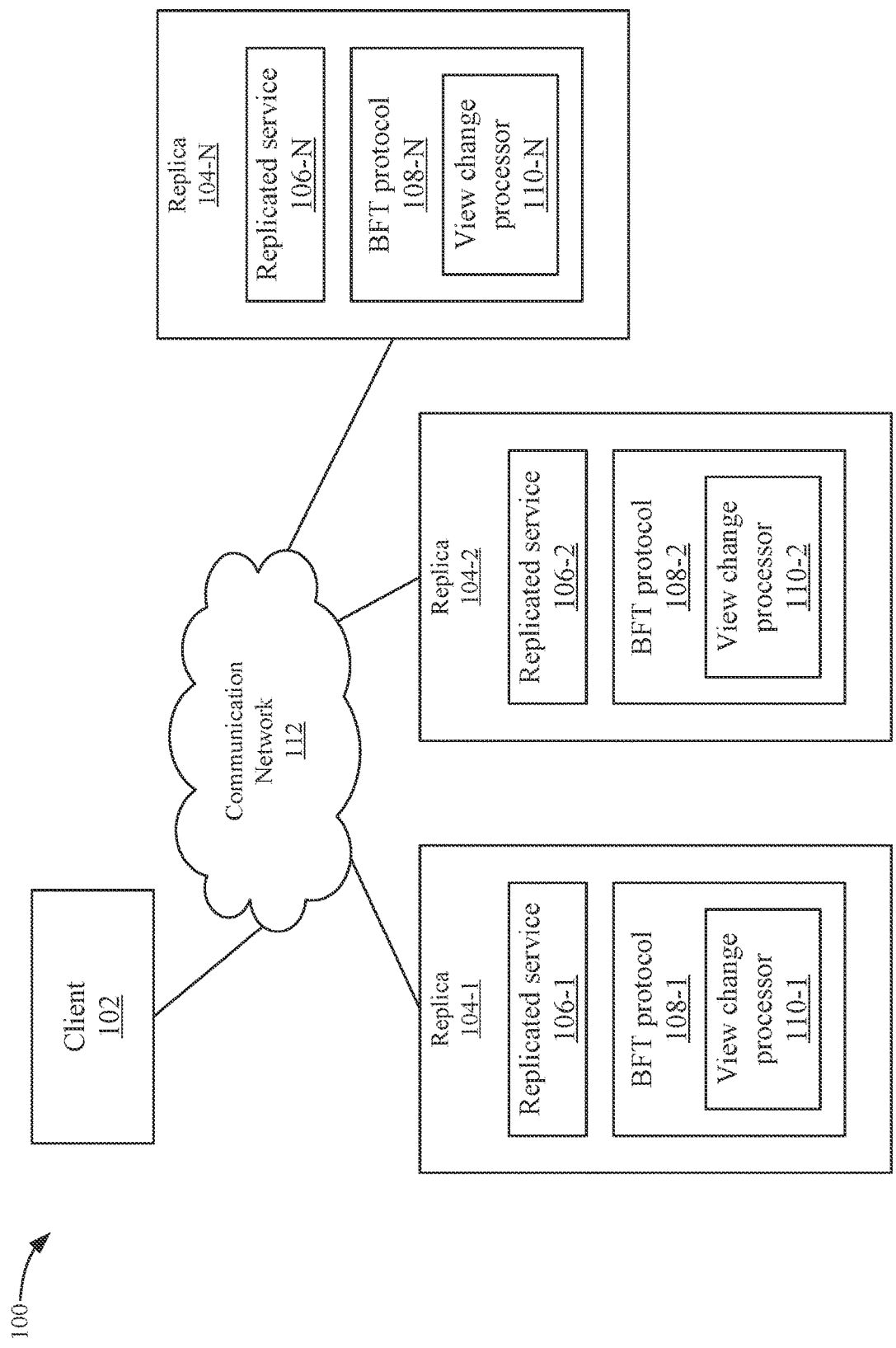
FIG. 1 depicts a system for implementing a state machine replication-based computing system according to some embodiments.

In the following description, for purposes of explanation, numerous examples and specific details are set forth to provide a thorough understanding of embodiments of the present disclosure. Some embodiments as expressed in the claims may include some or all the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

A system may use a consensus protocol for state machine replication, such as a Byzantine Fault Tolerance (BFT) protocol, that adds an additional triggering phase to a view change procedure. In the triggering phase, replicas exchange and collect messages, referred to as complaint messages, for the current view when a condition is met to perform a view change procedure. In contrast to the procedure described in the Background, replicas may use the triggering phase in the view change procedure instead of immediately moving to the next view. The triggering phase requires collecting a property, such as a quorum of complaint messages to be received, before moving to the next view. For example, a replica may send a complaint message that asks to leave the current view, which may be broadcast to all peers in the system. Replicas may collect complaint messages from different replicas and move to the next phase of the view change procedure to actually move to the next view when the received number of complaint messages meets a quorum. That is, a replica that has sent a complaint message will not move to the next view until the required number of complaint messages is collected from other peers for the current view. Also, a replica that has not sent a complaint message, but collects the required number of complaint messages from its peers, will also initiate the view change procedure and move to the next view. The property may also be determined in ways other than using a quorum, such as using any proof that the condition to move to the next view has been detected.

Using the triggering phase provides advantages over the view change procedure described in the Background. For example, a replica that may incur a temporary issue sends a complaint message in the current view to ask to leave the current view. However, the replica will not move to the next view until the required number of complaint messages is received. Once the issue is resolved, the replica may re-join voting in the current view for committing and executing operations for client requests. This avoids the replica that experienced the temporary issue moving to a next view for an unbounded time period while its peers stay in the current view.

The use of the triggering phase also may have many advantages in different implementations of BFT protocols. For example, one instance of a BFT protocol may include an optimization that introduces a single round fast path for committing and executing operations for client requests in an optimistic scenario. The fast path provides better performance as long as the conditions for performing the fast path are met, such as the system includes all replicas connected to each other, and the time for them to exchange messages is within a given time bound, or if a C parameter is used, with up to C replicas each being disconnected from its peers. If the conditions are not met, such as if there are any intermittent network problems, the system switches to a slow path of execution. The slow path of execution requires additional messaging compared to the fast path, and is thus slower. When a replica moves to the next view in a situation as described in the Background, the system may not be able to move back to the fast path after moving to the slow path because the replica is not voting in the current view to commit and execute requests. However, using the additional triggering phase, when the issues are resolved and the replica can resume voting in the current view, the system may be able to move back to the fast path of committing and executing operations for the client requests. This provides an advantage of increased performance when temporary issues are resolved.

System Overview

FIG. 1 depicts a system 100 for implementing a state machine replication-based computing system according to some embodiments. System 100 includes a client 102 and N replicas 104-1, 104-2, . . . , 104-N (collectively referred to as replicas 104). Replicas 104 may be interconnected via a communication network 112. Each replica 104 may be a physical or virtual machine that is configured to run an instance of a replicated service 106 (respectively replicated service 106-1, replicated service 106-2, . . . , replicated service 106-N). Examples of replicated service 106 include a data storage service, a block chain service storage, etc. Client 102 consumes replicated service 106 by submitting requests for service operations to a replica 104. In response, replicas 104 perform the operation for the request by committing and executing the request. The commitment of an operation may indicate a quorum of replicas has voted on or agreed on the proposal sent by a primary replica 104. Replicas 104 may then execute the operation. Replicas 104 may update respective state to reflect the results of the execution.

To ensure that replicas 104 sequence the execution of the operation for the request submitted by client 102 in an identical fashion and thus maintain consistent service states, the state machine replication system may run a protocol on each replica 104, such as a BFT protocol (respective BFT protocols 108-1, 108-2, . . . , 108-N). Examples of BFT protocols include practical BFT (PBFT), scalable BFT (SBFT), and other protocols. As mentioned above, in one example of a protocol, in each view, one replica, referred as a primary replica, sends a proposal for a decision value (e.g., operation sequence number) to the other non-primary replicas and attempts to get 2f+1 replicas to agree upon the proposal, where f is the maximum number of replicas that may be faulty.

As discussed above, the system uses a view based system where a consensus decision is reached in a view. As discussed in the Background, previously, a replica 104 that detects a condition, such as a proposal that did not succeed (e.g., was not committed and executed) within a time period, enters into the view change procedure and moves to the new view. In contrast to the procedure in the Background, a view change processor 110 (respectively, view change processors 110-1, 110-2, . . . , 110-N) may perform a triggering phase in the view change procedure before determining to move to the next view. To illustrate the differences between the two procedures, the following will describe the previous view change procedure in FIGS. 2A and 2B, and then describe the new view change procedure with the additional triggering phase in FIGS. 3A-3C. Following that, a description of one implementation of BFT protocol that uses a fast path and a slow path will be described highlighting the advantages of using the triggering phase in the view change procedure. However, it is noted that the triggering phase may be used in different implementations of BFT protocols, such as any BFT protocol that uses a view change procedure.

Prior View Change Procedure

Figure 2A:
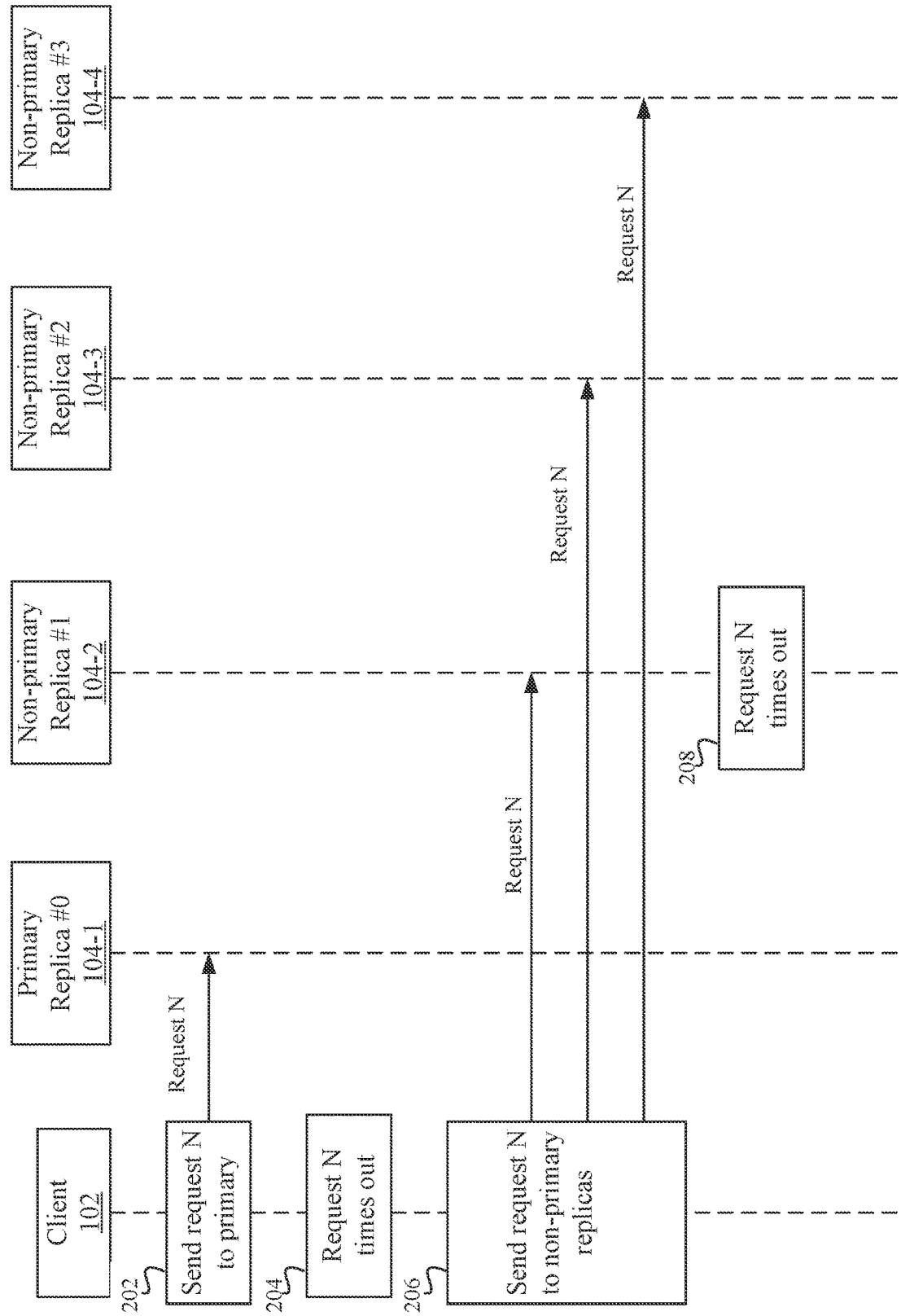
FIGS. 2A and 2B depict a prior view change procedure that does not use a triggering phase.
Figure 2B:
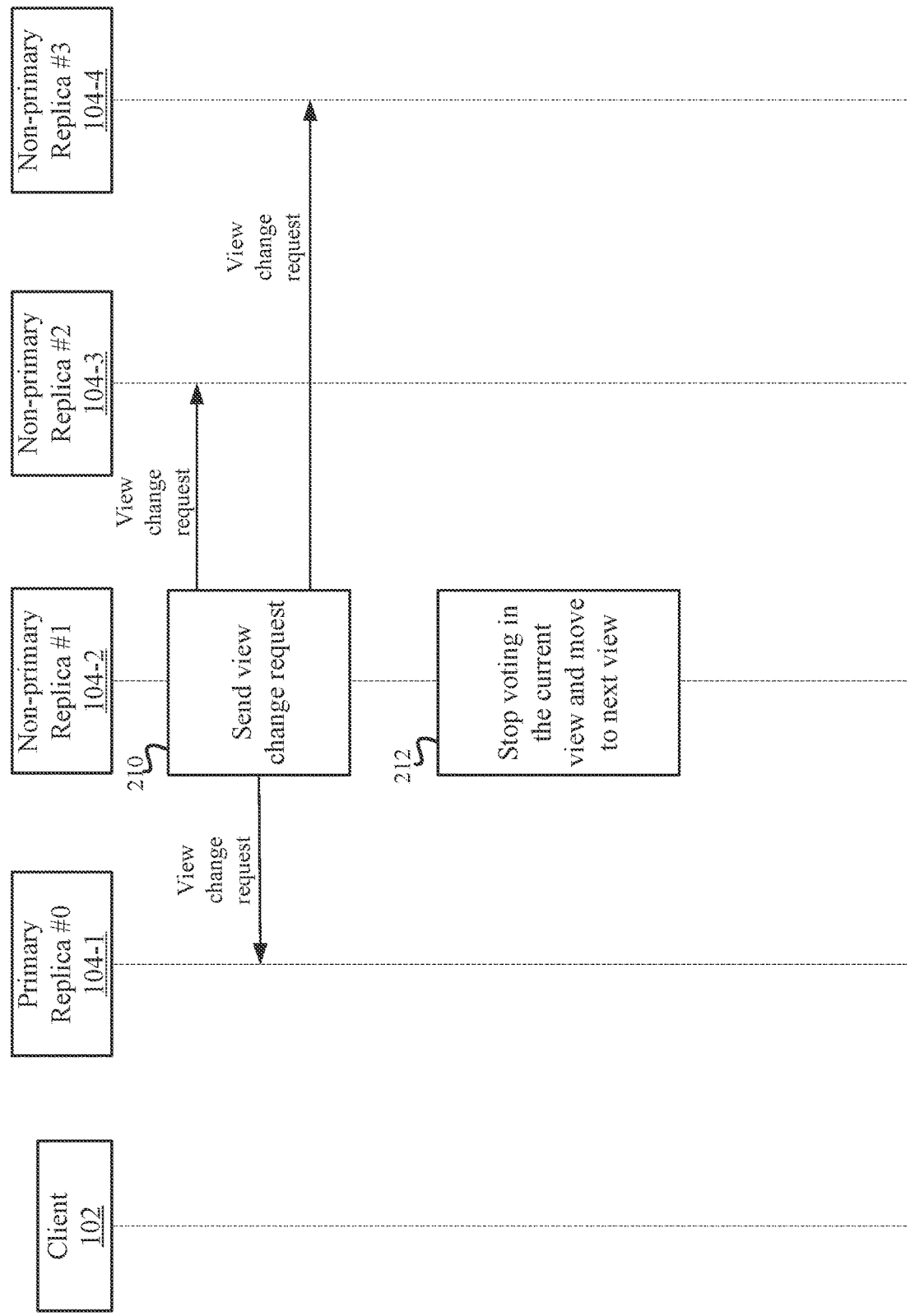

FIGS. 2A and 2B depict a prior view change procedure that does not use a triggering phase. Although the following process describes an example of when a view change procedure is initiated, it will be understood that other situations may cause a view change procedure to be performed. For example, the following discusses a time out event causes the view change procedure. However, another condition may be based on behavior of a primary replica, such as the primary replica has signed contradicting messages, which can only happen if the primary replica has been compromised or is malicious. The detection of this behavior may cause the view change procedure to be initiated as described below. Other situations may also be contemplated. Accordingly, the following process that results in a view change is for illustrative purposes only.

In FIG. 2A, a client 102, a primary replica #0 104-1, and non-primary replica #1 104-2, non-primary replica #2 104-3, and non-primary replica #3 104-4 are shown. Primary replica 104 may be designated as a leader of the current view and, at 202, can receive a request N from client 102 to execute a service operation. "N" is an identifier for the request, such as a request #1. In a BFT protocol, primary replica 104-1 may start a process to commit and execute a service operation for request N. As described above, primary replica 104-1 sends a proposal for a decision value to the other non-primary replicas 104-2, 104-3, and 104-4, and attempts to get 2f+1 replicas to agree upon the proposal (e.g., via voting messages), which results in committing and executing the operation. This process is not shown in FIG. 2A. It is contemplated that different protocols may commit and execute the service operation for the request differently. For the current description, it is assumed that the procedure fails for some reason. For example, when the service operation is not committed and executed within a time period, at 204, request N times out at client 102. For example, after sending request N, client 102 starts a timer that represents a time period for request N to be committed and executed. Client 102 determines that request N times out when this timer ends without client 102 receiving confirmation of the commitment and execution of request N.

When client 102 does not receive confirmation that request N has been committed and executed by the time the timer runs out, client 102 may perform another action, such as proceeding to send request N to non-primary replicas in an attempt to have the service operation performed. For example, at 206, client 102 sends request N to non-primary replicas 104-2, 104-3, and 104-4. If the request has already been processed, a non-primary replica 104 may re-send the reply that was already sent to client 102. Otherwise, a non-primary replica 104 may relay the request to primary replica 104-1. If primary replica 104-1 does not multicast the request to non-primary replicas 104, non-primary replicas 104 will eventually suspect that primary replica 104-1 is faulty. For example, upon a non-primary replica 104 receiving request N, non-primary replica 104 starts a timer. If request N is not committed and executed by the time the timer runs out, that non-primary replica 104 will initiate the view change procedure. For example, at 208, a timer for request N at non-primary replica 104-2 times out.

Referring to FIG. 2B, after initiating the view change procedure, at 210, non-primary replica 104-2 sends a view change request message to its peers, such as primary replica 104-1, non-primary replica 104-3, and non-primary replica 104-4. The view change request message may include the necessary information for the state machine replication system to preserve safety guarantees when moving to a new view is finalized. Different protocols may use different methods to ensure safety when processing service operations in the new view. Then, at 212, non-primary replica 104-2 stops voting in the current view and moves to the next view. This means non-primary replica 104-2 does not participate in processing of service operations in the current view anymore. When in the next view, non-primary replica 104-2 waits for a quorum of view change messages, such as $2*f+2*C+1$, where C is a parameter that defines C replicas 104 that are allowed to be disconnected from its peers. Also, non-primary replica 104-2 may require a message from a new primary replica that identifies it as the new primary replica in the next view to start voting in the next view. Thereafter, non-primary replica 104-2 may start voting in the next view to process client requests proposed by the new primary replica 104.

View Change with a Triggering Phase

Figure 3B:
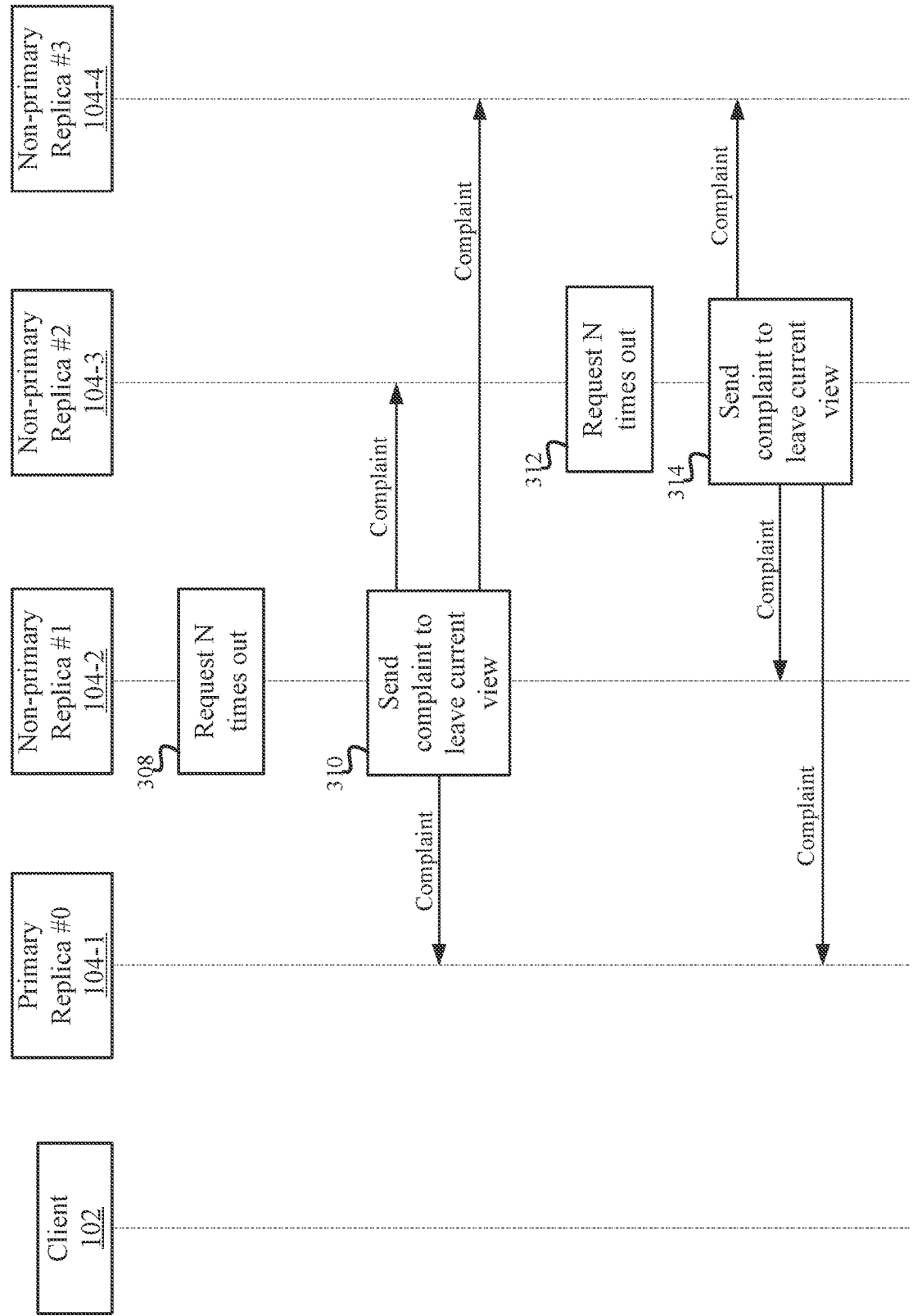
Figure 3C:
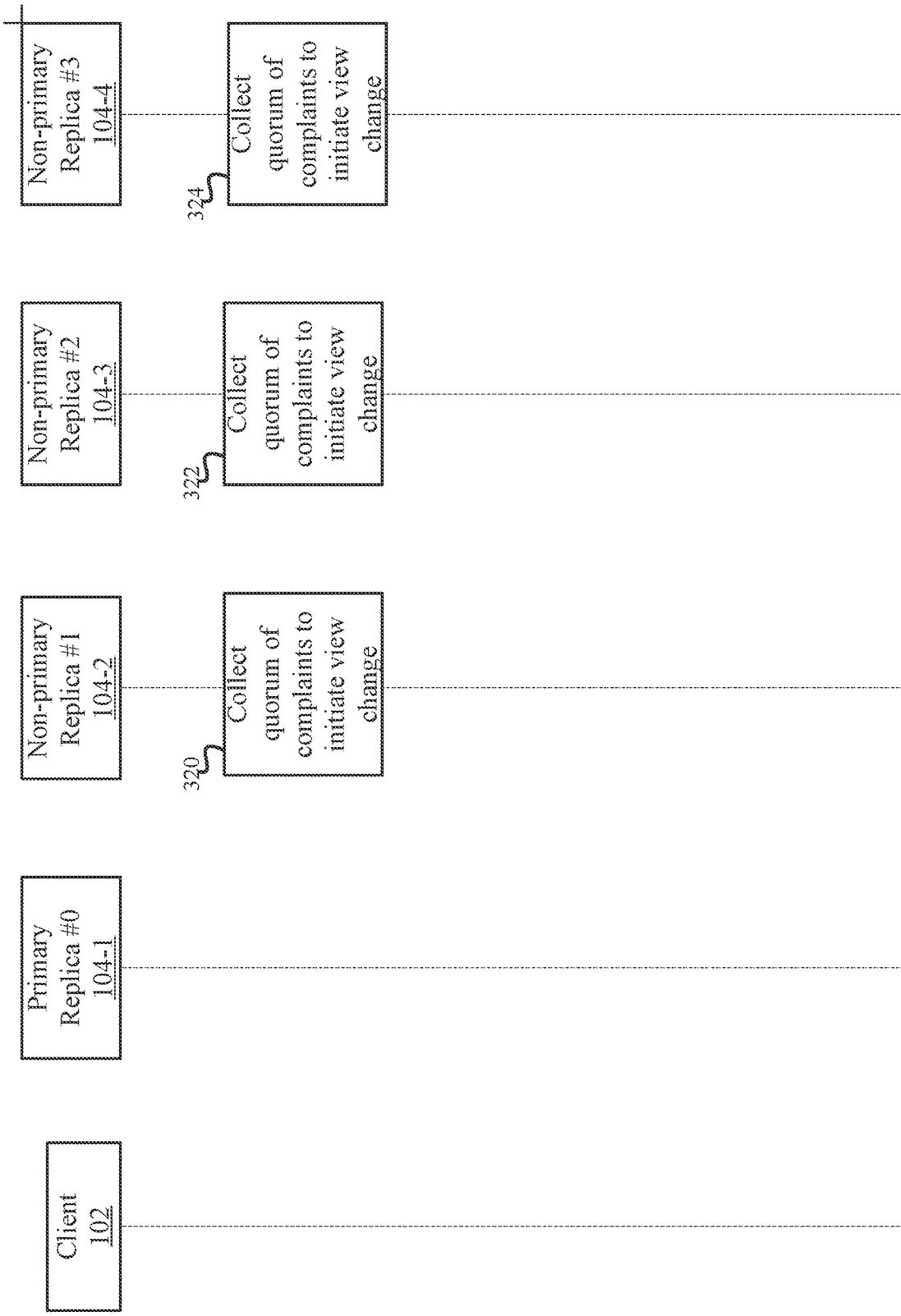

FIGS. 3A to 3D depict a view change procedure that uses the triggering phase according to some embodiments. For brevity, every protocol message communicated between replicas may be digitally signed by the sender and the receiver verifies the digital signature upon message receipt. Any one of a number of digital signature schemes may be used for this purpose, including threshold signatures or multi-signatures. In FIG. 3A, similar actions occur at 302, 304, and 306 as described at 202, 204, and 206 of FIG. 2A where client 102 sends a request N to primary replica 104-1, which times out at client 102, and then client 102 sends request N to non-primary replicas 104-2, 104-3, and 104-4. Moving to FIG. 3B, request N times out at 308 in non-primary replica 104-2. Instead of moving to the next view, at 310, view change processor 110-2 in non-primary replica 104-2 starts a triggering phase that is performed before moving to the next view. For example, the triggering phase generally includes messaging between peers in the machine state replication system to agree on moving to the next view. As discussed above, the messages may be referred to as complaint messages, and a quorum, such as f+1 complaint messages, are required to be received and verified by a replica 104 before moving to the next view. An example of this process will now be described in more detail.

At 310, upon determining an issue that initiates the view change procedure (e.g., request N times out at a non-primary replica 104-2), non-primary replica 104-2 sends a complaint message to leave the current view. The complaint message may be sent to peers, such as primary replica 104-1, non-primary replica 104-3, and non-primary replica 104-4. The complaint message includes information that may indicate non-primary replica 104-2 wants to leave the current view, such as an identifier that indicates the message is a complaint message, and other parameters that may be needed to process the complaint message, such as a current view number. Also, to ensure safety of the system, the complaint message may be digitally signed by non-primary replica 104 and any receiver of the complaint message may verify the digital signature. The digital signature may allow other replicas 104 to forward complaint messages on behalf of others to speed up the exchange process. Also, each replica 104 may verify the signature of the complaint message before accepting the complaint message. The triggering phase may also occur in other non-primary replicas 104. For example, at 312 and 314, view change processor 110-3 of non-primary replica 104-3 detects that request N has timed out and sends a complaint message to leave the current view to its peers.

Before moving to the next view, each respective replica 104 may wait to collect a quorum of complaint messages from different replicas, such as f+1 complaints. The number of required complaint messages for the quorum may be configured differently. For example, a quorum may be f+1 verified complaint messages to ensure the view change cannot happen with only f faulty replicas, e.g., at least one non-faulty replica 104 is required to send a complaint message. The required number of messages may be configured differently based on the desired safety requirements in the system. In this example, referring to FIG. 3C, at 320 and 322, non-primary replicas 104-2 and 104-3 respectively, collect a quorum of complaint messages to continue with moving to the next view in the view change procedure. It is noted that based on conditions detected in each replica 104, replicas 104 in the system may or may not send a complaint message to leave the current view. For example, some non-primary replicas 104 may not detect an issue to start the view change procedure and may not send complaint messages. However, non-primary replicas 104 may move to the next view when sufficient proof is received, such as in collecting the quorum of complaint messages. For example, when a replica 104 that has not sent a complaint message, but manages to collect f+1 complaint messages from different peers for the current view, that replica 104 will also send a view change request and move to the next view. In this example, view change processor 110-4 of non-primary replica 104-4 collects the quorum of complaint messages to initiate the view change procedure even though non-primary replica 104-4 did not send a complaint message. As will be discussed below, non-primary replica 104-4 may still move to the next view.

Figure 3D:
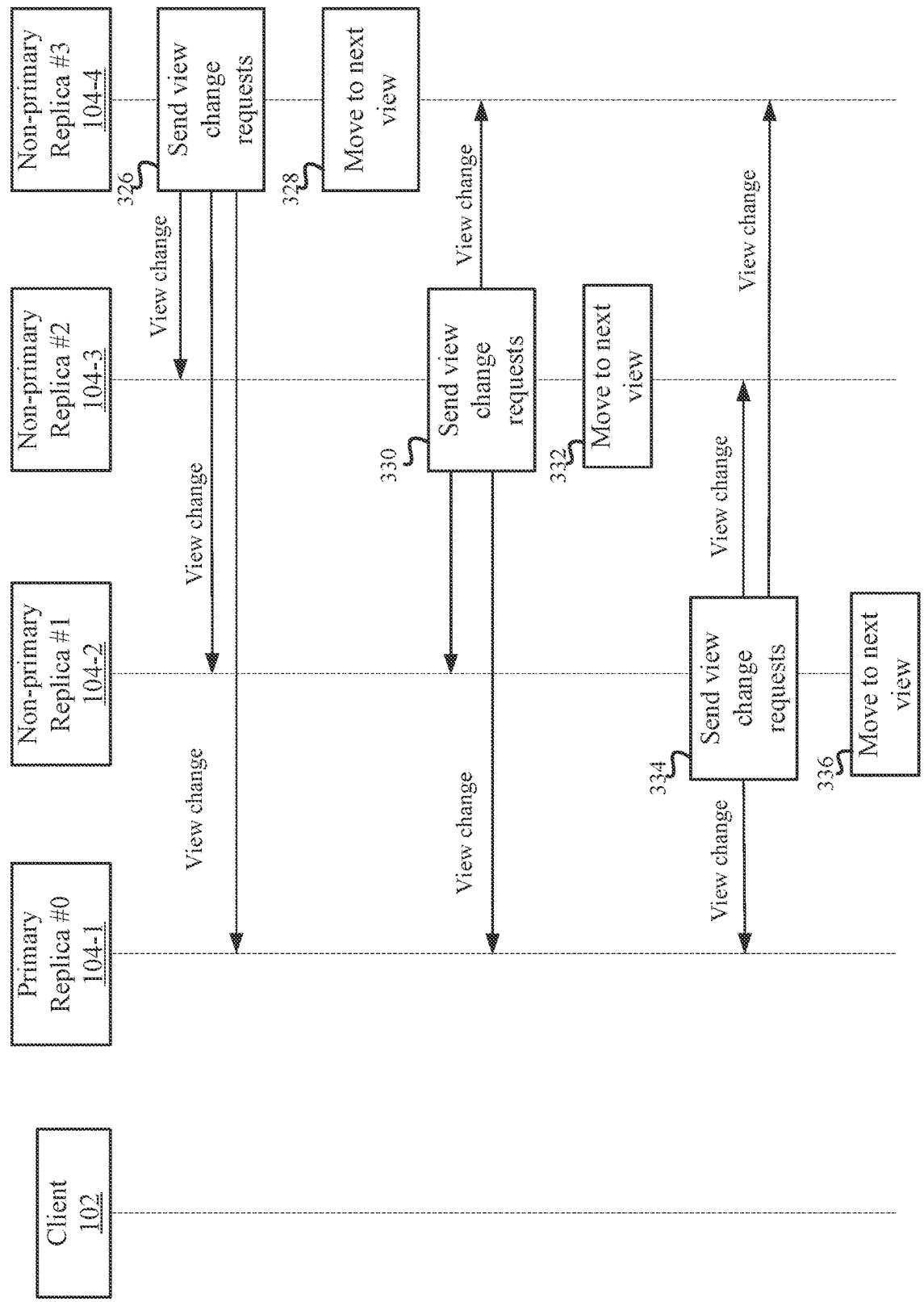

Once collecting a quorum of complaint messages, the process may proceed as described above at 210 and 212 in FIG. 2B where a non-primary replica 104 sends a view change request to its peers, stops voting in the current view, and moves to the next view. This process is illustrated in FIG. 3D where at 330 and 332, non-primary replica 104-3 sends a view change request and moves to the next view; and at 334 and 336, non-primary replica 104-2 does the same. Also, non-primary replica 104-4 initiates the view change to the next view by sending view change requests, and then, at 328, moves to the next view and stops voting in the current view. As noted above, non-primary replica 104-4 had not detected an issue and sent a complaint message.

Figure 4:
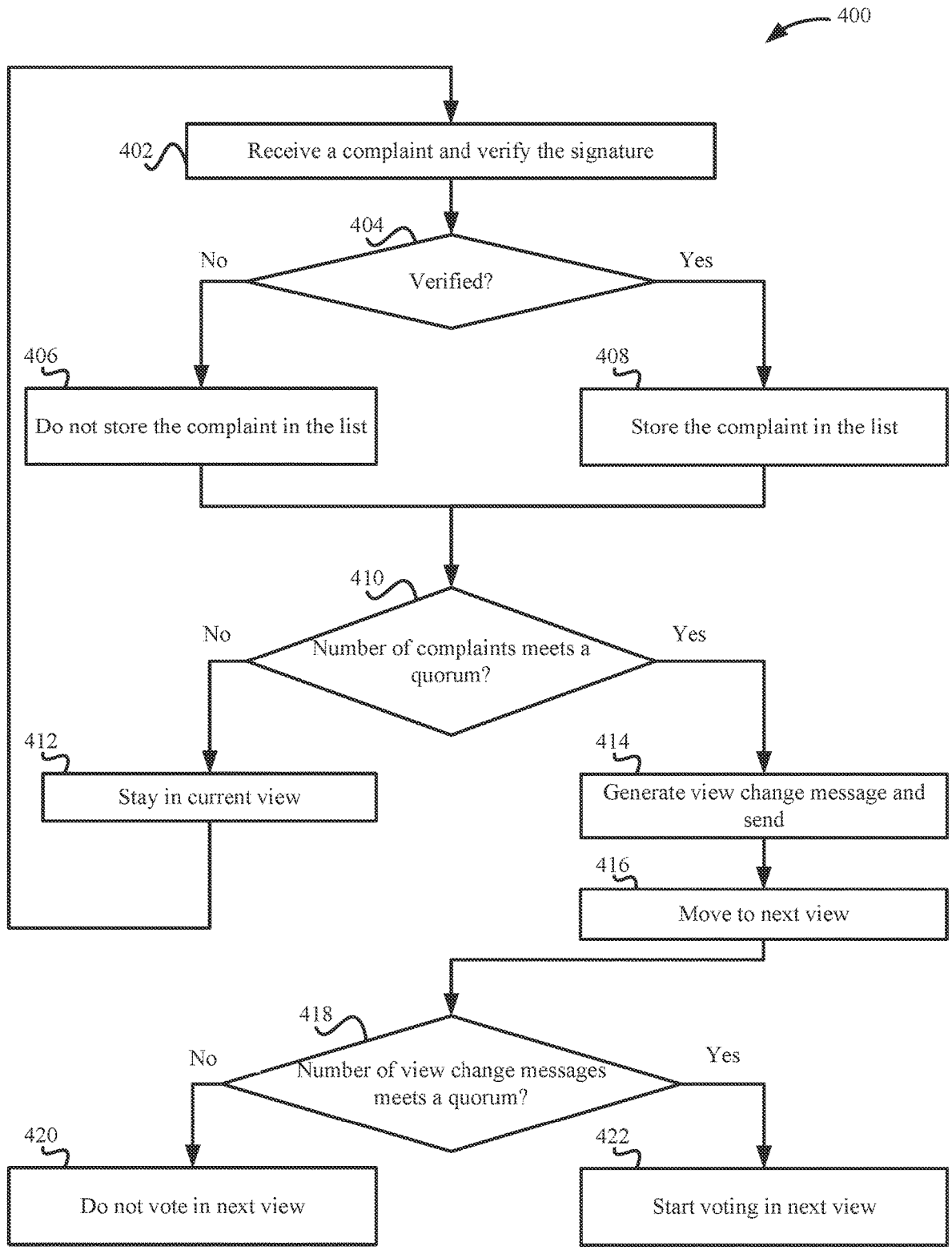
FIG. 4 depicts a simplified flowchart of a method for performing a triggering phase in the view change procedure according to some embodiments.

The following will now describe a more detailed example of the processing described in FIGS. 3A to 3D. FIG. 4 depicts a simplified flowchart 400 of a method for performing a triggering phase in the view change procedure according to some embodiments. The process may be performed by a primary replica 104 and/or a non-primary replica 104. In this process, a replica 104 may use a list to keep track of complaint messages that are received. The list may be any type of storage that can store and keep track of complaint messages that are received. Additionally, although not shown, replica 104 may store its own complaint in the list, if applicable. At 402, view change processor 110 in replica 104 receives a complaint message and verifies the signature of the complaint message. At 404, view change processor 110 determines if the signature was verified. If not, at 406, view change processor 110 does not store the complaint in a list. At 408, if the signature is verified, view change processor 110 may store the complaint message in the list. For example, view change processor 110 may store information that may identify the replica that sent the request. Other information may be stored, such as the view in which the complaint is sent such that complaint messages are not duplicated for the same replica.

At 410, view change processor 110 determines if the number of complaint messages in the list meets a quorum, such as f+1 complaint messages. If the number of complaint messages does not meet the quorum, at 412, replica 104 stays in the current view. The process then reiterates to 402 where replica 104 may receive another complaint message. As discussed above, replica 104 may continue to vote in the current view and does not move to the new view.

At 414, if the number of complaint messages meets the threshold, view change processor 110 generates and sends the view change message. Then, at 416, view change processor 110 moves to the next view. View change processor 110 may also clear the list of complaint messages when moving to the next view.

Once moving to the next view, replica 104 waits in the next view until a quorum of view change messages is received (and a new primary replica 104 is identified), and then joins voting in the next view. For example, at 418, view change processor 110 determines when a number of view change messages meets a quorum, such as 2*f+2*C+1. If the quorum is not met, at 420, replica 104 does not vote in the next view. At 422, if the quorum is met, replica 104 starts voting in the next view.

Fast Path and Slow Path

As described above, a BFT protocol may use multiple modes of execution, such as a fast path and a slow path. The fast path may require fewer messages to be exchanged between peers in the system to commit and execute an operation compared to a slow path. For example, a fast path may be an optimistic scenario when the system detects a condition, such as the system includes all replicas 104 connected to each other, and the time for them to exchange messages is within a given time bound. In the fast path, consensus on committing and executing an operation is reached with a full quorum between replicas 104, or if a C parameter is used, with up to C replicas 104 each being disconnected from its peers. If the above condition is not met, the system falls back to using a slow path to commit and execute operations. As can be appreciated, using the slow path to commit and execute operations may take a longer amount of time compared to using the fast path. The following will now describe the fast path and the slow path for context, and show the advantages of using the triggering phase to allow the system to move from the slow path to the fast path when an issue occurs.

Figure 5:
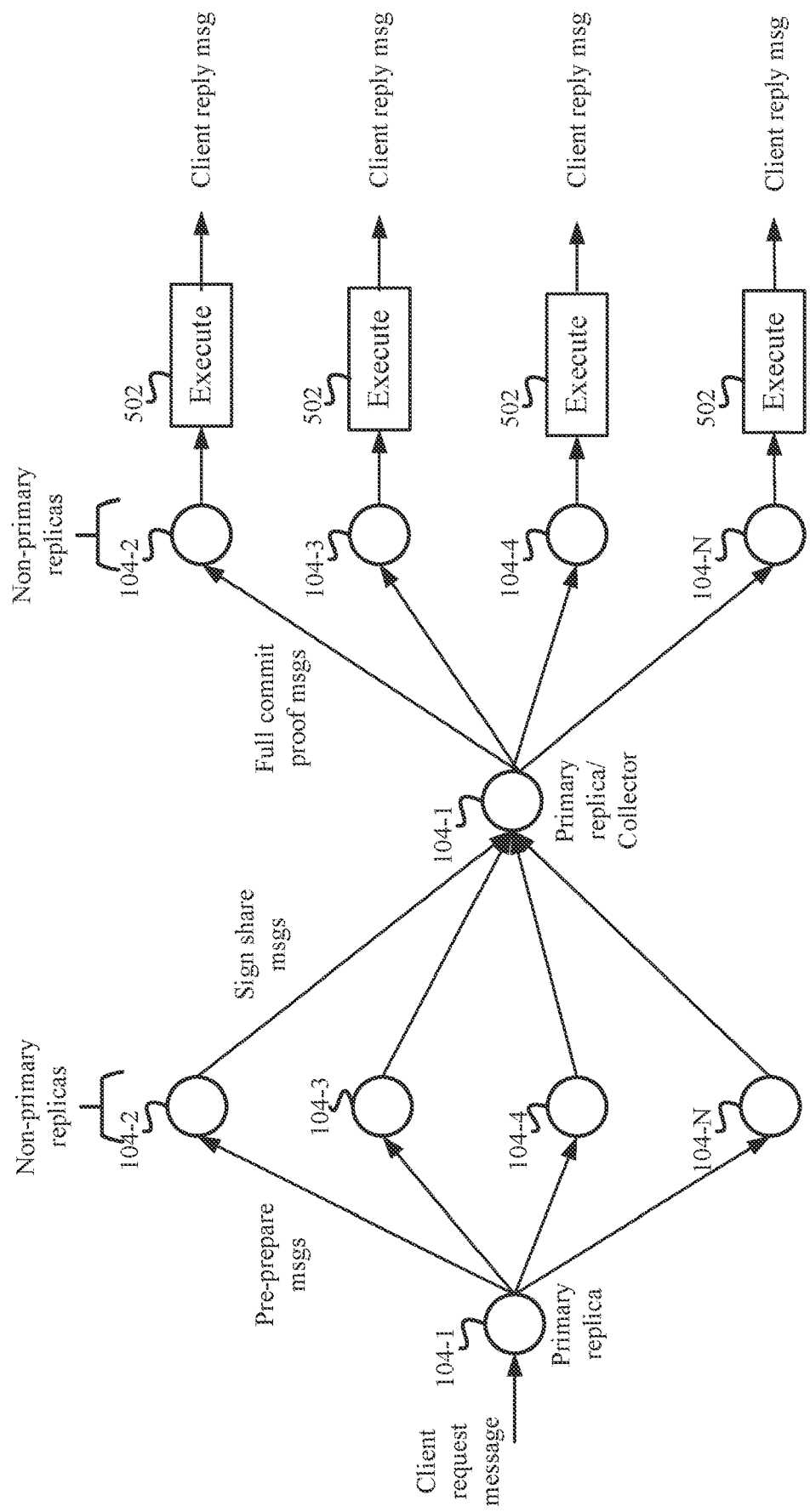
FIG. 5 depicts an example of a fast path for committing and executing requests according to some embodiments.

FIG. 5 depicts an example of a fast path for committing and executing requests according to some embodiments. The fast path may include only one round-trip of messaging between a primary replica 104-1 and non-primary replicas 104-2 to 104-N when the conditions for the fast path are met. A round-trip may be a communication from primary replica 104-1 to non-primary replicas 104-2 to 104-N, and then back to primary replica 104-1 (or a collector). The fast path may include three phases of a pre-prepare phase, sign share phase, and a full commit proof phase. It is noted that the following description is simplified and details of the operations that are performed by each replica 104 to commit and execute the operations are not described, but a person of skill in the art will appreciate how to implement the operations. For example, details of processing each message are omitted because different operations may be performed in different protocols. However, an important difference between the fast path and the slow path is the number of messages that need to be communicated between replicas 104 to commit and execute a request.

To start the fast path, a primary replica 104-1 accepts a client request message for a service operation. Primary replica 104-1 can generate a proposal for a decision block that needs to be agreed upon cbased on the client request. Then, primary replica 104-1 broadcasts a pre-prepare message by forwarding the prepare message to all non-primary replicas 104-2 to 104-N. As used herein, the act of "broadcasting" a message includes sending the message to yourself (e.g., to primary replica 104-1).

In a sign share phase, each non-primary replica 104 may perform different operations to authenticate the contents of the pre-prepare message. If authenticated, each non-primary replica 104 sends sign share messages to primary replica 104-1 (or a collector) that indicate the prepare messages were authenticated. A collector may be a designated replica that collects the sign share messages for processing. For discussion purposes, primary replica 104-1 may be used, but it will be understood one or more collectors may be used in place of primary replica 104-1.

In the commit-proof phase, primary replica 104-1 generates a signature of the decision and sends it back to all non-primary replicas 104-2-104-N to indicate the decision block can be committed. Then, at 502, non-primary replicas 104-2 to 104-N may commit and execute the sequence number for a decision block. In the execute phase, each replica 104-2 to 104-N may generate a succinct execution certificate and send the certificate in a client reply message to client 102. The above process may indicate a consensus on a sequence number for the decision block for the client request has been reached.

Figure 6:
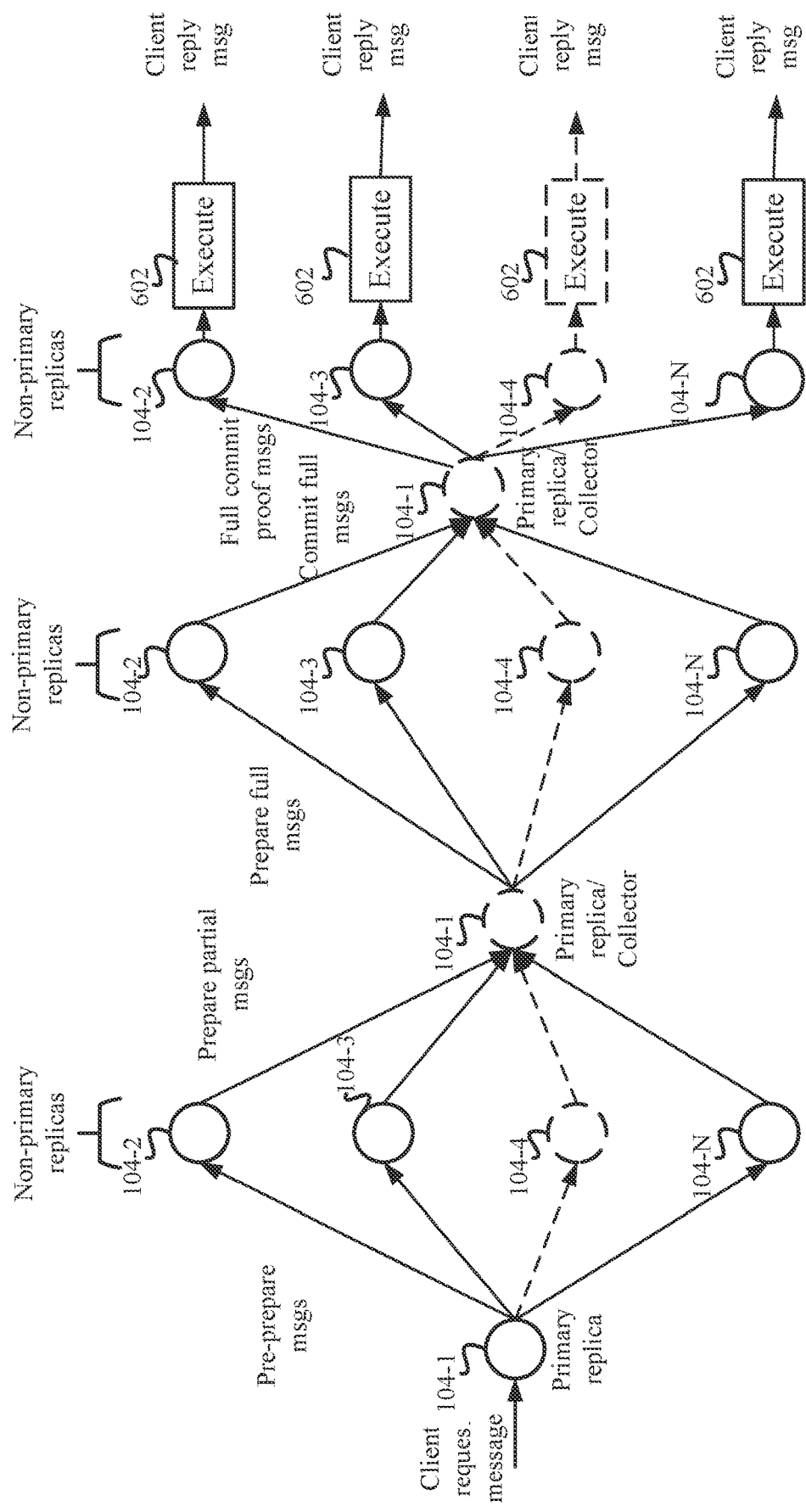
FIG. 6 depicts a slow path for committing and executing requests according to some embodiments.

FIG. 6 depicts a slow path for committing and executing requests according to some embodiments. If the quorum of agreement required for the fast path is not met, the system moves to a slow path. It is noted that different variations of the slow path may be used. In this example, the slow path includes four phases: a prepare phase, prepare partial phase, prepare full phase, commit full phase, and a full commit proof phase. The slow path includes two round trips of messaging between a primary replica 104 and non-primary replicas 104-2 to 104-N.

As shown, a non-primary replica 104-4 is not participating in or agreeing to the proposed assignment of a sequence number to the client request message from primary replica 104-1. The non-participation is represented by dotted lines in FIG. 6. After receiving the pre-prepare messages, non-primary replicas 104 authenticate the contents of the pre-prepare message as described above and respond to primary replica 104-1. If the requirements for a fast path are not met, the protocol may require extra messaging between primary replica 104-1 and non-primary replicas 104-2 to 104-N to commit and execute the request. For example, primary replica 104-1 may not receive enough responses from non-primary replicas 104 to meet a quorum for the fast path. In this case, primary replica 104-1 cannot prepare the full commit proof messages to complete the fast path. In some examples, primary replica 104-1 may not be able to form a signature that is required for the fast path because at least non-primary replica 104-4 did not respond. As such, the messages received by primary replica 104-1 are referred to as prepare partial messages in this phase. Primary replica 104-1 then may revert to another process to commit and execute the request. For example, primary replica 104-1 may use a process described in Practical BFT, which sends prepare full messages, commit full messages, and full commit proof messages to commit and execute the request at 602. The operations performed by primary replica 104-1 and non-primary replicas 104-2 to 104-N will not be described, but a person of skill in the art will appreciate how to commit and execute a request using another round-trip without the participation of non-primary replica 104-4. Although Practical BFT is described, the slow path may use other protocols to commit and execute a request.

Typically, primary replica/collector 104-1 may not receive a response from non-primary replica 104-4 due to an issue, such as increased latency in communication, replica 104-4 is disconnected from its peers, or replica 104-4 is faulty. It is possible the issue may resolve and non-primary replica 104-4 can rejoin the voting in the current view. For example, using the triggering phase in the view change procedure, when non-primary replica 104-4 experiences an issue, non-primary replica 104-4 may send the complaint message to ask to leave the current view, but does not move to the next view. When the issue is resolved, non-primary replica 104-4 may resume voting in the current view, such as non-primary replica 104-4 is reconnected to its peers and can respond to prepare messages. This may result in meeting the conditions for using the fast path (e.g., all non-primary replicas 104 respond with sign share messages). Then, the system can revert to using the fast path. When there is an actual problem, and the quorum of complaint messages from replicas 104 is received, replicas 104 can go to the next view and be in sync to start processing requests in the next view. Accordingly, until the quorum of complaint message is received, no honest replica 104 will leave the current view it is in and as soon as it is able to participate in voting again, it will do so. Also, replicas 104 can have other replicas 104 join them in the next view when the quorum of complaint messages is reached.

CONCLUSION

Accordingly, the addition of the triggering phase may allow replicas 104 to remain in a current view even when an issue occurs to initiate the view change procedure. This provides advantages in replicas 104 can rejoin participating in the current view instead of waiting in a next view. Also, the triggering phase may allow replicas 104 to move to the next view in concert when the property to move is obtained, such as a quorum of complaint messages. That is, non-faulty replicas that collect the quorum of messages also move to the next view even without detecting any problems in the system. Further, a system may be able to use a more optimal mode when a replica 104 rejoins participating in the current view. However, even a protocol that does not use multiple modes may see advantages of using the triggering phase. For example, having more eligible replicas 104 to process requests allows a quorum to be met more easily. Also, some replicas 104 may process requests faster, and these replicas can be used in the current view to reach a quorum instead of having these replicas waiting in the next view.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. Various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method for implementing a Byzantine fault tolerant (BFT) state machine replication (SMR) protocol running on a computing system comprising N replicas, the method comprising:
   detecting, by a first replica, a condition to cause a view change procedure to move from a current view to a next view in the BFT SMR protocol;
   sending, by the first replica, a message indicating the first replica wants to leave the current view;
   receiving, by the first replica, a set of messages from a set of second replicas indicating a respective second replica wants to leave the current view;
   determining, by the first replica, when a property is received to leave the current view based on the set of messages from the set of second replicas;
   when it is determined the property is received, performing, by the first replica, a process to leave the current view; and
   when it is determined the property is not received, staying, by the first replica, in the current view and participating in processing a request from a client in the current view.

2. The method of claim 1, wherein determining when the property is received comprises:
   storing information for the set of messages from the set of second replicas and/or the message indicating the first replica wants to leave the current view in a list; and
   comparing a number of messages that are stored in the list to a threshold to determine if a quorum is reached.

3. The method of claim 1, wherein the condition pertains to an issue at the first replica that prevents the first replica from sending responses to one or more other replicas,
   wherein when it is determined the property is not received, the request is processed using a first path of communication between the N replicas, and
   wherein when it is determined the property is received, the request is processed in the current view using a second path of communication between the N replicas that is distinct from the first path, the second path including fewer messaging roundtrips between the N replicas than the first path.

4. The method of claim 1, further comprising:
   receiving a request to process an operation from another replica in the current view; and
   processing the operation when the condition that caused the view change procedure is resolved.

5. The method of claim 1, wherein when it is determined the property is received, performing:
   sending a view change request to move to a next view; and
   moving to the next view.

6. The method of claim 5, further comprising:
   in the next view, detecting a quorum of view change requests from other replicas, wherein a view change request is received from the other replicas upon the other replicas receiving the property to leave the current view.

7. The method of claim 1, wherein another replica that has not sent a message indicating the replica wants to leave the current view performs the process to leave the current view upon determining the property is received to leave the current view based on the set of messages from the set of second replicas.

8. A non-transitory computer-readable storage medium containing instructions for implementing a Byzantine fault tolerant (BFT) state machine replication (SMR) protocol running on a computing system comprising N replicas, wherein the instructions, when executed, control a first replica to be operable for:
   detecting a condition to cause a view change procedure to move from a current view to a next view in the BFT SMR protocol;
   sending a message indicating the first replica wants to leave the current view;
   receiving a set of messages from a set of second replicas indicating a respective second replica wants to leave the current view;
   determining when a property is received to leave the current view based on the set of messages from the set of second replicas;
   when it is determined the property is received, performing a process to leave the current view; and
   when it is determined the property is not received, staying in the current view and participating in processing a request from a client in the current view.

9. The non-transitory computer-readable storage medium of claim 8, wherein determining when the property is received comprises:
   storing information for the set of messages from the set of second replicas and/or the message indicating the first replica wants to leave the current view in a list; and
   comparing a number of messages that are stored in the list to a threshold to determine if a quorum is reached.

10. The non-transitory computer-readable storage medium of claim 8, wherein the condition pertains to an issue at the first replica that prevents the first replica from sending responses to one or more other replicas,
   wherein when it is determined the property is not received, the request is processed using a first path of communication between the N replicas, and
   wherein when it is determined the property is received, the request is processed in the current view using a second path of communication between the N replicas that is distinct from the first path, the second path including fewer messaging roundtrips between the N replicas than the first path.

11. The non-transitory computer-readable storage medium of claim 8, further operable for:

receiving a request to process an operation from another replica in the current view; and processing the operation when the condition that caused the view change procedure is resolved.

12. The non-transitory computer-readable storage medium of claim 8, wherein when it is determined the property is received, performing:

sending a view change request to move to a next view; and moving to the next view.

13. The non-transitory computer-readable storage medium of claim 12, further comprising:

in the next view, detecting a quorum of view change requests from other replicas, wherein a view change request is received from the other replicas upon the other replicas receiving the property to leave the current view.

14. The non-transitory computer-readable storage medium of claim 8, wherein another replica that has not sent a message indicating the replica wants to leave the current view performs the process to leave the current view upon determining the property is received to leave the current view based on the set of messages from the set of second replicas.

15. An apparatus for a first replica that implements a Byzantine fault tolerant (BFT) state machine replication (SMR) protocol running on a computing system comprising N replicas, the apparatus comprising:

one or more computer processors; and a non-transitory computer-readable storage medium comprising instructions, that when executed, control the one or more computer processors to be operable for:

detecting a condition to cause a view change procedure to move from a current view to a next view in the BFT SMR protocol;

sending a message indicating the first replica wants to leave the current view;

receiving a set of messages from a set of second replicas indicating a respective second replica wants to leave the current view;

determining when a property is received to leave the current view based on the set of messages from the set of second replicas;

when it is determined the property is received, performing a process to leave the current view; and when it is determined the property is not received, staying in the current view and participating in processing a request from a client in the current view.

16. The apparatus of claim 15, wherein determining when the property is received comprises:

storing information for the set of messages from the set of second replicas and/or the message indicating the first replica wants to leave the current view in a list; and comparing a number of messages that are stored in the list to a threshold to determine if a quorum is reached.

17. The apparatus of claim 15, wherein the condition pertains to an issue at the first replica that prevents the first replica from sending responses to one or more other replicas, wherein when it is determined the property is not received, the request is processed using a first path of communication between the N replicas, and wherein when it is determined the property is received, the request is processed in the current view using a second path of communication between the N replicas that is distinct from the first path, the second path including fewer messaging roundtrips between the N replicas than the first path.

18. The apparatus of claim 15, further operable for:

receiving a request to process an operation from another replica in the current view; and processing the operation when the condition that caused the view change procedure is resolved.

19. The apparatus of claim 15, wherein when it is determined the property is received, performing:

sending a view change request to move to a next view; and moving to the next view.

20. The apparatus of claim 19, further comprising:

in the next view, detecting a quorum of view change requests from other replicas, wherein a view change request is received from the other replicas upon the other replicas receiving the property to leave the current view.

21. The apparatus of claim 15, wherein another replica that has not sent a message indicating the replica wants to leave the current view performs the process to leave the current view upon determining the property is received to leave the current view based on the set of messages from the set of second replicas.

* * * * *